Nov. 28, 1944. H. R. LARSEN ET AL 2,363,877

THEODOLITE

Filed Feb. 11, 1943 3 Sheets-Sheet 1

Inventor
Harold R. Larsen
and John B. Sonderman

By

Attorneys

Nov. 28, 1944.　　H. R. LARSEN ET AL　　2,363,877
THEODOLITE
Filed Feb. 11, 1943　　3 Sheets-Sheet 2
Fig. 5
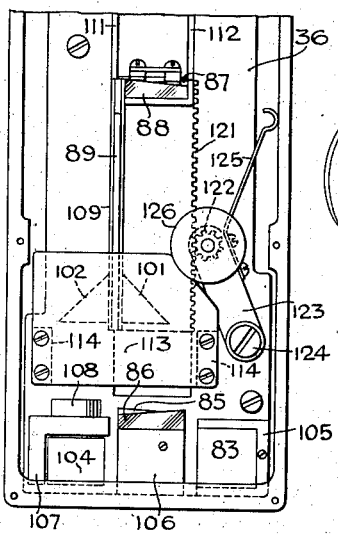
Fig. 4
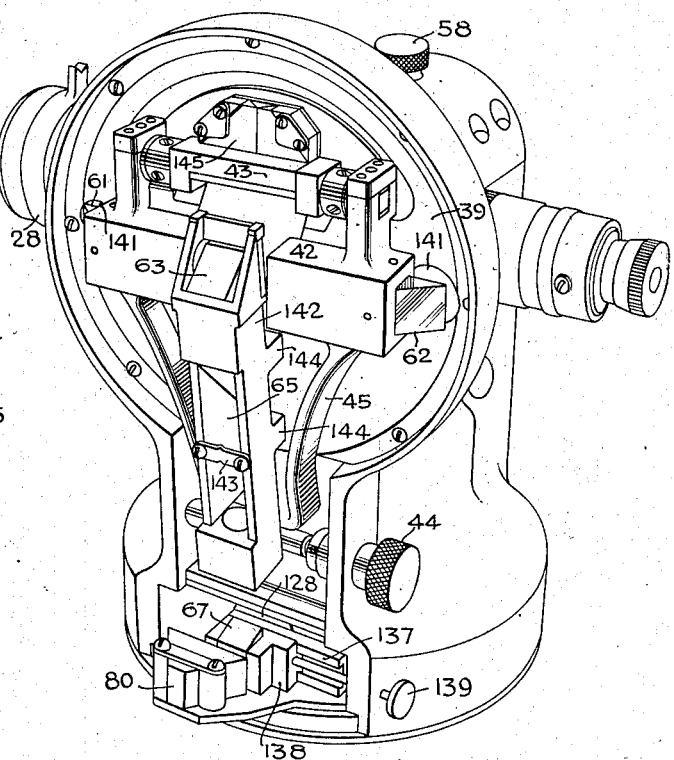
Fig. 2
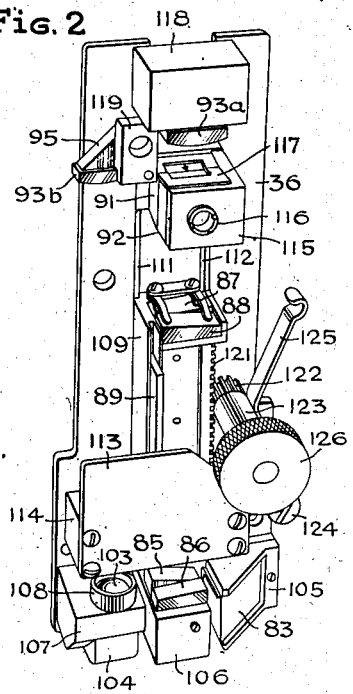
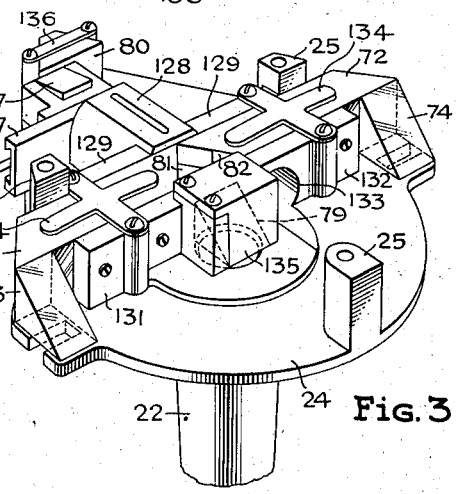
Fig. 3
Inventor
Harold R. Larsen
and John B. Sonderman
By Dodge and Inn
Attorneys Nov. 28, 1944.　　　H. R. LARSEN ET AL　　　2,363,877
THEODOLITE
Filed Feb. 11, 1943　　　3 Sheets-Sheet 3
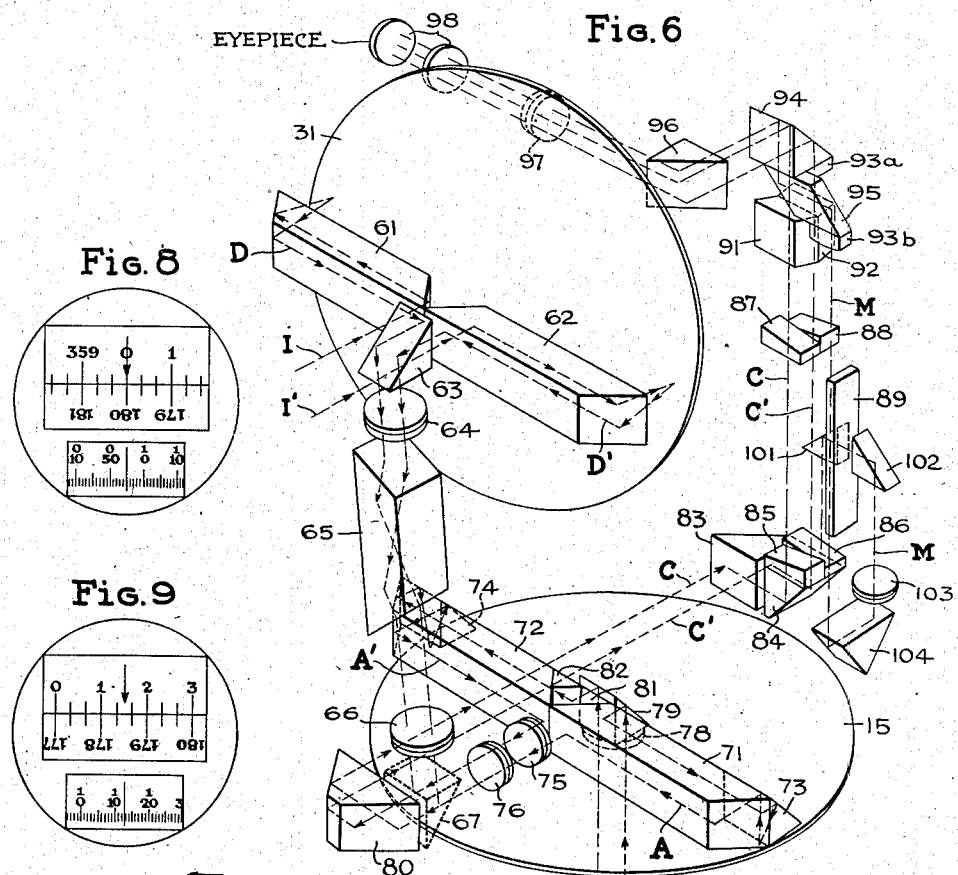
Fig. 6
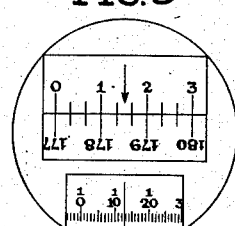
Fig. 8
Fig. 9
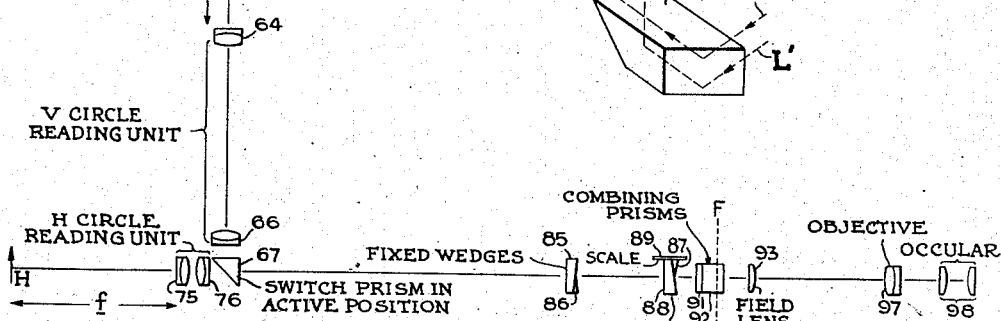
Fig. 7
Inventor
Harold R. Larsen
and John B. Sonderman
By
Dodge and Son
Attorneys Patented Nov. 28, 1944

2,363,877

UNITED STATES PATENT OFFICE 2,363,877

THEODOLITE

Harold R. Larsen and John B. Sonderman, Troy, N. Y., assignors to W. & L. E., Gurley, Troy, N. Y., a corporation of New York Application February 11, 1943, Serial No. 475,540

16 Claims. (Cl. 88—2.6)

This invention relates to optical systems for reading graduated circles. These systems can be used to read the graduated circles of various "geometrical instruments," but have had their chief field of commercial use in surveying instruments such as precise transits and theodolites.

The basic principle underlying these systems is the production of two juxtaposed images of two portions of the graduated circle spaced apart 180°, and measurement by means of an optical micrometer of the displacement of one of these images necessary to cause register of the graduations appearing in the two images. By correcting a primary reading (taken directly from one image) by the micrometer reading, a precise reading of the angular position of the graduated circle may be had.

Advantages of these systems are that registration can be visually determined with great precision; reading diametrically opposite points averages out any error arising from minute eccentricity of the graduated circle; and the readings of two circles can be taken through a single optical micrometer by the use of a single reading telescope. This telescope can be located with its eyepiece adjacent the eyepiece of the main telescope.

In the prior art devices, limitations imposed by the size and form of the surveying instrument have been critical, and the accuracy theoretically attainable has not been achieved. Also, the cost of these instruments has been excessive because they were so designed that it was impossible to avail of economies inherent in mass production of parts.

The present invention offers advantages in several important respects, as follows:

1. The optical micrometer comprises two sets of reversely arranged wedge prisms. The first set diverts the image rays. The second set restores the original direction. One of the two sets is fixed and the other is movable in the direction of the axis of the optical system, where this extends vertically within a portion of the frame which supports the telescope trunnion. This permits a long adjustment path and precise guiding of the moving prisms, with consequent precision in determining the position of the prisms. The arrangement of the prisms so that the rays leaving the micrometer are restored to their original direction renders the micrometer indifferent to the focusing adjustments of the reading telescope.

2. The precision so secured is preserved by reading (in the reading telescope through which the images of the graduated circle are observed) the actual position of the movable prisms. In prior art devices the micrometer reading has been taken from some mechanically related part which moves the optical elements of the micrometer, and hence does not always precisely indicate their true position.

3. The optical system for reading two graduated circles comprises the reading telescope and three unitary sub-assemblies, each of which is permanently mounted on a supporting element which is removable from the surveying instrument. Thus each sub-assembly is susceptible of independent checking in an appropriate optical jig, so that all adjustments may be perfected outside the surveying instrument. The sub-assemblies can even be made on an interchangeable basis. With present day manufacturing tolerances, full interchangeability of sub-assemblies can be secured by permissible adjustment of components of the sub-assembly.

4. The entire optical micrometer is comprised within a single one of the three sub-assemblies and hence may be checked for performance as a unit and while it is removed from the instrument and consequently is completely accessible.

As indicating the precision already attained, the invention has been successfully embodied in a theodolite whose graduated circles are four inches in diameter. These can be read without interpolation to one second of arc.

The invention as so embodied will now be described with reference to the accompanying drawings in which:

Fig. 2 is a perspective view of the optical micrometer sub-assembly removed from the instrument.

Fig. 3 is a perspective view of the sub-assembly comprising the reading unit for the horizontal circle.

Fig. 4 is a perspective view of the sub-assembly which includes the vertical circle reading unit and a precision leveling mechanism for this unit.

Fig. 5 is a fragmentary detail of the wedge prism supporting carriage mechanism forming part of the optical micrometer.

Fig. 6 is a perspective diagram of the optical system for reading both graduated circles.

Fig. 7 is a simplified diagram of the basic circle-reading optical system omitting those prisms which have simple reflecting functions (except the switch prism).

Figure 1:
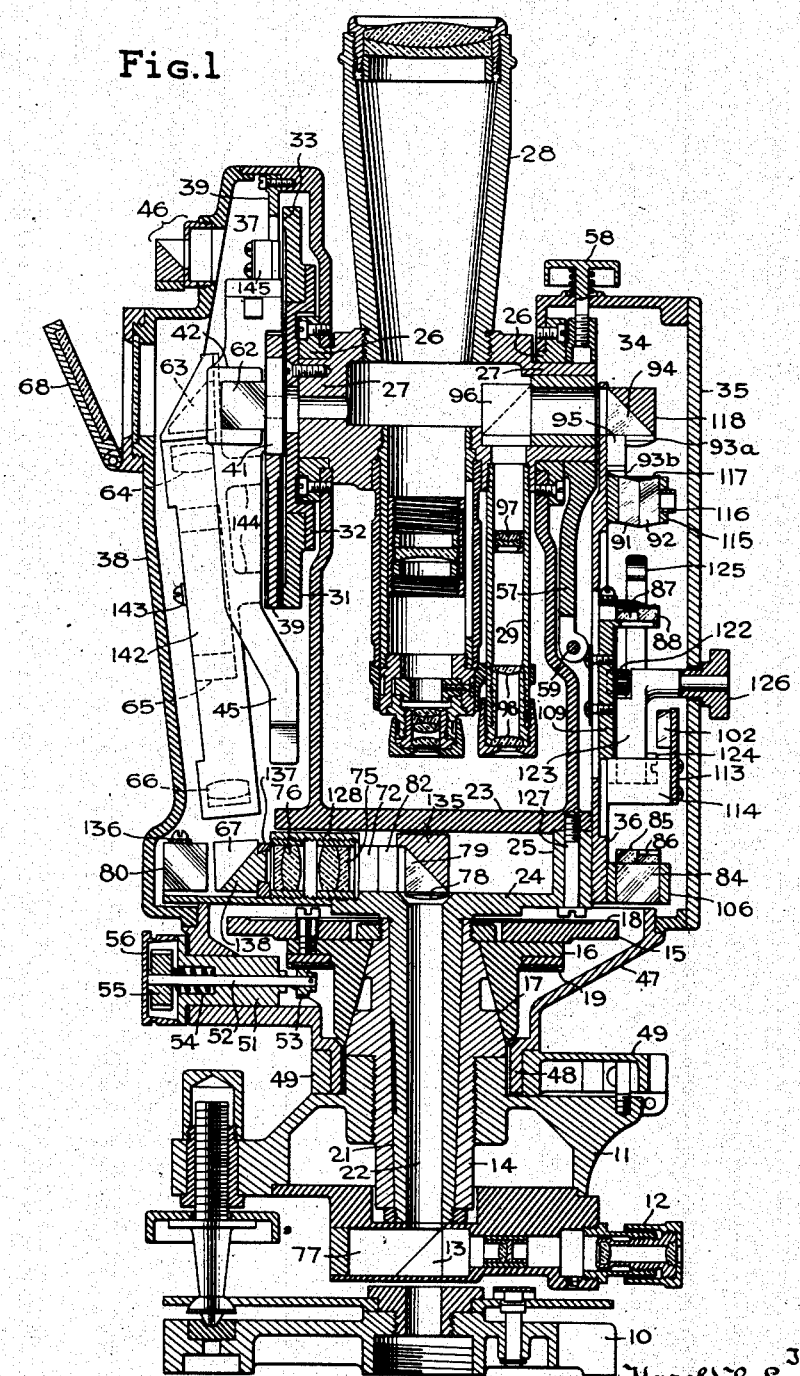
Fig. 1 is a vertical axial section of the theodolite with its telescope pointed at the zenith.

Fig. 8 indicates the image as it appears in the reading telescope when reading 0°, 0′, 55″.

Fig. 9 is a similar view, for a reading of 1°, 31′, 12.8″.

Because the various prisms, though important in the practical embodiment of this concept, tend to obscure the basic optical system used for reading the graduated circle, reference will first be made to the simplified diagram, Fig. 7. On this figure the elements will be identified by legends supplemented by the reference numerals hereinafter used in the detailed description, so that the basic elements may readily be identified in the other figures.

In Fig. 7 the arrow V represents a graduation on the vertical circle and arrow H a graduation on the horizontal circle. Each is effectively spaced a distance $f$ from a corresponding one of two identical reading lenses 64 and 75. The focal length of each lens 64, 75 is $f$. There are respective associated lenses 66 and 76 which also are identical with one another. The reading unit 64, 66 is shown optically associated with the micrometer and the reading telescope unit. The reading unit 75, 76 may be substituted in optically the same relation by removing the switch prism 67 which is movably mounted to permit it to be alternatively effective and inactive.

The separation of lenses 75 and 76 is less than the separation of lenses 64 and 66, and can be so because 64 and 75 each produce an image which is effectively at infinity, so that either lens 66 or 76, depending on the position of the switch prism, will pick up the image and focus it at the focal plane F—F.

Actually each reading lens system projects two adjacent images of diametrically opposite portions of its graduated circle, there being dividing prism systems (omitted from Fig. 7) between each circle and the corresponding system of reading lenses. The optical micrometer unit displaces these two images in opposite directions transverse to the image graduations and is adjustable to vary the displacement. It includes means to measure the displacement necessary to secure register of the image graduations.

The optical micrometer comprises, in the order stated, a pair of fixed wedge prisms 85, 86, arraged side by side, base to apex, one affecting each image, the pair acting to divert the two sets of image rays, a similar but reversely arranged pair of movable wedge prisms 87, 88 acting to restore the original direction, coincidence prisms 91, 92 at the focal plane F—F, and a field lens 93.

The movable wedge prisms are guided along the optical axis, and their effective range of adjustment is that which will product a relative displacement of the viewed graduation images equal to one graduation interval. Hence proportional parts of a graduation interval can be determined by reading the position of the prisms on a graduated scale whose length equals the effective range of adjustment. The reading is taken when the prisms have been set to cause register of the graduations in the two images. This optical micrometer is an important feature of the invention, individually and in combination with the reading telescope.

The function of the coincidence prisms is to deflect the images so that the ends of the graduations in the two images meet on a straight line, thus affording an optical boundary. The coincidence prisms also serve to assure proper relation of the ray paths at the exit pupil. The two images move respectively in opposite directions when the micrometer is adjusted, and their motions are parallel with the line on which they meet. The reading adjustment is correct when the graduations of one series aline or register with those of the other.

The reading telescope is a conventional unit comprising objective 97 and ocular 98, as indicated. It is desirably located parallel with the main telescope of the instrument so that their eyepieces are adjacent. A pair of 90° reflecting prisms (not shown in Fig. 7) are interposed in the optical path between the reading telescope and the field lens to permit tilting of the telescope.

The carriage which guides the movable pair of wedges also carries a longitudinally extending transparent graduated scale 89 whose position is read against an index through the telescope and field lens. To permit this, an offset prism is associated with the field lens, so as to affect only part of the field. This, with a reading lens and two reflecting prisms, causes an image of the graduated scale to appear at one side of the field of view in the reading telescope, where it may be read against a fixed index. These parts are not included in Fig. 7.

To reconcile the dimensional requirements of such an optical system with the form and dimensions of a theodolite of small size and light weight, and to secure from two different graduated circles readings which are appropriate in direction and can be read from one point always in the same way, requires the use of reflecting prisms whose form and arrangement is more significant than their casual omission from Fig. 7 might suggest.

The general structure of the theodolite is shown in sufficient detail in Fig. 1, no novelty being here claimed for the theodolite as such. Statements of direction made in describing the instrument are to be interpreted as referring to Fig. 1.

In Fig. 1 a conventional base 10 supports a conventional three-screw leveling head 11. An "optical plumb bob" of known form is indicated as comprising a telescope 12 and reflecting prism 13. The leveling head carries the bearing member 14 on which coaxial vertical bearings are formed for the horizontal circle and the instrument frame or "alidade." This common axis is the vertical axis of the instrument.

The horizontal graduated circle 15 is supported on hub 16 which turns on the conical bearing 17 formed externally on member 14. The upper face of the peripheral annular boss 18 has a circular series of radial graduations which in the actual embodiment are at twenty minute intervals, forming what is called the horizontal limb. The hub 16 carries a circular series of rack teeth 19, for a purpose to be described.

The member 14 is formed with an internal conical bearing 21, coaxial with conical bearing 17, and in bearing 21 turns the supporting spindle 22 which carries the instrument frame 23. The spindle 22 has a plate-like head 24 which is connected to the base plate of frame 23, by the projecting bosses 25. The interval provided by the bosses 25 receives and the head 24 supports the optical components of the sub-assembly which comprises the reading unit for the horizontal circle.

The frame 23 has bearings 26 for the supporting trunnions 27 of the main telescope 28. These bearings define the horizontal axis of the instrument. Both trunnions are hollow, the left hand one can be used to permit passage of light to illuminate the cross hairs (not shown), and the right hand one is used to permit the micrometer scale image and gradutaed circle images to be viewed by the reading telescope whose tube 29 is adjacent the main telescope and moves therewith.

The vertical graduated circle 31 is carried by a hub 32 fixed to the end of the left hand trunnion 27. The outer plane face of the peripheral annular boss 33 has a circular series of radial graduations at twenty minute intervals, forming what is called the vertical limb. The intervals in the two limbs must be the same. The horizontal limb is graduated clockwise in one series through 360 degrees. The vertical limb is graduated similarly with zero where the telescope is directed at the zenith, the measured angle increasing as the direct telescope is depressed from the zenith setting.

As clearly indicated in Fig. 1, the two trunnion bearings 26 are carried by respective hollow standards. The right hand standard encloses a chamber 34 accessible by removing the cover plate 35. A plate 36 releasably attached to frame 23 carries the optical micrometer assembly which is completely housed in chamber 34.

The left hand standard encloses a chamber 37 accessible upon removal of cover plate 38. In chamber 37 and overlying vertical circle 31 is a supporting plate 39 removably attached to frame 23 by screws. The reading lens system for the vertical circle is fixedly mounted on this plate. Plate 39 is formed with a bearing large in diameter, short in length and coaxial with the horizontal axis. This receives journal 41 formed on yoke 42 so that the yoke is tiltable. The journal is retained by a cap of thin sheet metal not visible in the drawings. Yoke 42 carries the reading prisms of the reading unit for the vertical circle. At the top of the yoke 42 is a sensitive level 43 which is used to level, and thus precisely zero the reading prisms after the instrument as a whole is leveled by means of the leveling head. This final precise adjustment is made by a tangent screw 44 of conventional form (see Fig. 4) which engages a pendant arm 45 on yoke 42.

The prism unit 46, swiveled in cover plate 38 is used to read the level 43. It may be turned to permit the level to be read from the front or back of the instrument.

Fixed to frame 23 and housing the horizontal circle and its hub is a pendant generally conical sleeve 47. At its lower end this has a flange 48 concentric with the vertical axis and encircled by the clamping band 49. This band may be actuated by a tangent screw providing familiar means for slowly turning the instrument about the vertical axis. This mechanism is common in the art and details of the tangent screw and clamp are not illustrated.

To turn the horizontal circle, for which neither slow-motion adjustment nor clamp is necessary, a pinion mechanism is mounted in bushing 51. A shaft 52 carries a pinion 53, normally disengaged from rack teeth 19, but urged toward engagement by the coil compression spring 54 which reacts between the bushing and the finger wheel 55. A hinged latching cap 56, when closed, holds the wheel 55 in its normal inner position with the pinion disengaged.

For slow motion and for clamping of the telescope on the horizontal axis, a clamp arm 57 is swiveled on the right hand trunnion 27. It may be clamped to the trunnion by turning clamp screw 58 (which extends through a slot in the frame 23). A conventional tangent screw (not shown) reacts upon arm 57 at 59.

The arrangement of the circle-reading optics will now be described, referring to Figures 6 and 1. In Fig. 6 the two graduated circles are schematically indicated. The view is in perspective looking obliquely to the right and downward relatively to Fig. 1. All supporting and masking parts are omitted.

In Fig. 6 light paths are traced by broken lines with arrow heads at intervals. The lines L, L' indicate the general paths of light to illuminate opposite portions of the horizontal circle and I, I' the paths of light to illuminate opposite portions of the vertical circle. The lines D, D' and A, A' trace the light paths from opposite points on the vertical and horizontal circles, respectively. Beyond the switch prism, the paths D and A continue alternatively as path C and similarly paths D' and A' continue alternatively as path C'. The line M represents the path of light from the micrometer scale.

The reading unit for the vertical circle comprises two similar reading prisms 61, 62, a reflecting prism 63, lens 64, Dove prism 65, lens 66 and switch prism 67. This is shown in Figs. 3 and 4 in its active position in which it relates the system just identified to the micrometer. It is indicated in dotted lines in the same position in Fig. 6. It can be shifted to an inactive position. Illumination is secured by daylight from the hinged and swiveled reflector 68 (or from a suitable artificial source similarly located). This light by-passes the prism 63 and follows the path I, I'.

The two reflecting prisms 61, 62 and prism 63 transmit rays from two diametrically opposite portions of the graduated circle to different portions of the field of lens 64. The portions are interchanged by Dove prism 65, this interchange being effected in order that both graduated circles can be read in the same sense.

The reading unit for the horizontal circle comprises similar reading prisms 71 and 72 with auxiliary reflecting prisms 73 and 74 cemented to their outer ends (see Fig. 3), and the lenses 75 and 76. To render this system effective, switch prism 67 must be shifted out of the optical paths A, A'. The optical characteristics are the same as those of the system used with the vertical circle, but the auxiliary prisms 73, 74 are necessary, because prisms 71, 72 are offset to clear the opening through spindle 22 through which light for illuminating the circle is transmitted, and because of certain requirements involving the relative positions of the projected images.

For illuminating the horizontal circle, light from any suitable source, natural or artificial, follows the path L, L' through reflecting prism 77, vertically through hollow spindle 22 and lens 78 to prism 79 (see also Fig. 3) whence it is reflected by the illuminating prisms 81 and 82 longitudinally through reading prisms 71 and 72, which direct it through prisms 73, 74 to the graduated circle, in boss 18.

Depending on the position of switch prism 67, the rays from one or another circle follows the paths C, C' through reflecting prisms 80, 83 and 84 and thence through respective fixed wedge prisms 85, 86 and respective movable wedge prisms 87, 88. These last prisms are guided to move in the direction of the vertical portions of paths C, C' and carry a graduated transparent scale 89.

The coincidence prisms 91, 92 are at the focal plane of the system.

The purpose of the field lens indicated by the numeral 93 in the simplified diagram of Fig. 7 is to form images on the objective lens 97 of the reading telescope. Actually there are three such images, two of which are formed alternatively, depending on the position of the switch prism 67. When this switch prism is in active position the field lens produces an image of lens 66 on a portion of lens 97. When the switch prism is inactive, an image of lens 76 is formed on the same portion of lens 97. Irrespective of the position of the switch prism 67, an image of lens 103 of the micrometer scale reading system is formed on another portion of lens 97.

To meet requirements as to the relative positions of lens 103 and the two lenses 66 and 76 in the particular instrument illustrated, it was desirable to construct the field lens in two parts and the two parts are indicated on Figs. 1, 2 and 6 (in which alone they are visible) by the reference letters 93a and 93b. The part 93a is associated with the system which, according to the position of the switch prism 67, reads either the vertical limb or the horizontal limb. The part 93b is associated with the system which reads the micrometer scale 89.

The image of the lens 103 is formed simultaneously with the images of the lenses 66 and 76. The system is so arranged that the reading telescope 29 affords two adjacent images, as indicated in Fig. 8. The image within the upper rectangle in Fig. 8 may be the image of either of the limb graduations, depending on the position of the switch prism 67. The image in the lower rectangle in Fig. 8 is the image of micrometer scale 89.

Again referring to Figs. 1, 2 and 6, the part 93a of the field lens is mounted below and cemented to the reflecting prism 94 in the paths CC'. The part 93b of the field lens is mounted beneath and cemented to the offset prism 95.

Prism 94 with prism 96 permits tilting of the telescope whose objective appears at 97 and ocular at 98.

The reflecting prism 101 collects some unused light passing the wedge prisms and directs it through the graduated portion of transparent scale 89 after which it is reflected by prism 102 through lens 103 and reflecting prism 104 to field lens portion 93b and thence via 95, 94, 96, 97 and 98. This is the means used to form an image of the graduations on scale 89, in the reading telescope.

The optical micrometer housed in chamber 34 and mounted as a unit on plate 36 is best shown in Figs. 1, 2 and 5. The plate 36 is attached to the vertical face of one of the lugs 25 on plate 24 and to portions of the alidade 23.

The prism 83 is mounted in a bracket 105 attached to the plate at its lower end. The prism 84 is clamped in the adjacent yoke 106 and the wedges 85 and 86 are cemented to the face of the prism 84. The prism 104 is held in a clamp 107 also attached to the lower end of the plate, and provided with a mount 108 for the lens 103.

A carriage 109 slides in vertical ways 111, 112 and carries the transparent graduated scale 89. A plate 113 supported by lugs 114 projecting from the plate 36 carries the prisms 101 and 102 (see Figs. 1 and 5) between which the scale 89 moves.

The index against which micrometer scale 89 is read may be variously located. It can satisfactorily be carried by the proximate face of prism 102, but because of the necessary finite distance between the scale and that face of prism 102, the image of the index and of the scale cannot both be precisely in focus. A better location is on that face of prism 95 against which the portion 93b of the field lens is cemented. To use this location it is necessary that the prism 95 be so designed that the optical distances from any chosen face of prism 94 to the index and to the focal plane of prisms 91, 92 are equal.

Assuming the limbs are graduated in 20 minute intervals, the graduations on scale 89 cover a range of ten minutes; i. e. there are ten intervals of one minute each, each subdivided into seconds.

The carriage 109 carries at its upper end the wedge prisms 87, 88, which are held by clips as best shown in Fig. 2.

The coincidence prisms 91, 92 are clamped in yoke 115 by tubular clamp screw 116. A mask 117 overlies the prisms. The index against which the limb graduations are read is on the focal plane immediately below this mask (see Fig. 2). Thus, if the second location suggested above for the micrometer index is used, both indexes will be similarly related to the optical system of the reading telescope in tube 29. The prisms 94 and 95 are respectively held by mounts 118 and 119. To each prism is cemented the corresponding portion 93a, 93b of the field lens.

The carriage 109 has rack teeth 121 along one edge. A pinion 122 engages these teeth and is journaled in a yoke 123 pivoted on screw 124. A leaf spring 125 urges the pinion into mesh so that all back-lash is taken up. A knurled knob 126 outside plate 35 is used to turn the pinion and thus adjust the micrometer by shifting the carriage 109.

The arrangement of the parts mounted as a unit on plate 24 is best shown in detail in Fig. 3, and to a limited extent in Fig. 4. Formed as a unit with the base are the three lugs 25 to which the alidade 23 is connected by screws. One such screw is shown at 127 in Fig. 1.

Within the space afforded by the lugs is a tubular housing 128 with lateral wing extensions 129. Spaced from these sufficiently to receive the prisms 71, 72 are lugs 131, 132, the latter having an aperture 133 for the passage of light from prism 80 to prism 83. Clips 134 retain the prisms. The extension prisms 73 and 74 overlie spaced supporting extensions formed on the periphery of plate 24, as clearly shown in Fig. 3.

A housing 135 encloses prism 79 and lens 78. The lenses 75 and 76 are carried by mounts threaded into tubular housing 128 (see Fig. 1). The prism 80 is held by clip 136 connected by screws to the tops of posts which are integral with plate 24 (Figs. 3 and 4).

Guide ways 137 (see Figs. 3 and 4) are formed as an integral extension of tubular housing 128 and receive a horizontally slidable carriage 138 in which the switch prisms 67 is mounted. A stem with knob 139 (Fig. 4) serves as means to shift the switch prism.

The vertical circle reading system is quite clearly shown in Fig. 4. Parts hidden in Fig. 4 can be found in Fig. 1. The plate 39 is attached to the alidade by a peripheral series of screws visible in Fig. 4, and has apertures 141 through which the graduations in the vertical limb are viewed. A mount 142 clamps the prism 63 at its upper end and houses, immediately below the prism, the lens 64 (see Fig. 1). At its lower end it houses lens 66 (see Fig. 1). These lenses are in threaded focusing mounts of the form illustrated with lenses 75 and 76 in Fig. 1, but this detail is conventional and hence is not illustrated. The Dove prism 65 is mounted between lenses 64 and 66 and is held by spring clip 143.

The mount 142 is rigidly attached to plate 39 by lugs 144 and does not partake of the tilting motion of the yoke 42.

The yoke 42 encloses the reading prisms 61, 62 and can tilt concentrically with the horizontal axis of the telescope trunnions on journal 41, through a very small angle, sufficient to zero the vertical angle reading system precisely after the instrument as a whole has been leveled by adjustment of the leveling head 11. Thus the precision of the sensitive level 143 is availed of to assure accurate zeroing of the instrument in reading vertical angles. The adjustment so made is so slight that the optical system for reading the limb is not deranged. The part 145 is a double prism coincidence device for reading the level bubble for which no novelty is claimed.

The method of reading the horizontal and vertical limbs can now be described. Since the method is the same for each limb, only one need be explained. Hence, assume that prism 67 is retracted so that the images on the upper rectangle of Figs. 8 and 9 are images of the graduations on boss 18 of horizontal limb 15.

If one looks through the reading telescope while slowly turning the alidade on the vertical axis, the upper and lower graduations will appear to move horizontally in opposite directions at equal rates. Hence their relative speed of motion will be twice their individual speed of motion past the index arrow. Thus, if the limb is graduated in 20 minute intervals, coincidences will occur every 10 minutes of arc.

Assume now a setting whose angle is to be read. Only rarely will the angle be an even multiple of 10 minutes, and so it is assumed that the graduations in the two series do not register. The next operation is to turn knob 126 until the images register. In this operation also the images will move at equal rates in opposite directions.

Depending on the angular setting, this will occur in either of two ways: (1) The graduations will coincide when two of them aline with the index as in Fig. 8, or (2) the two will coincide when the index bisects an interval as in Fig. 9.

In the first case, read the upper scale image against the index and add the micrometer reading. Thus Fig. 8 reads 0° (on the upper scale) +0' 55" (on the micrometer image) or 0°, 0', 55".

In the second case, read the value of the nearest division of the upper image to the left of the index, increased by 10 minutes for the half interval to the index plus the reading of the micrometer. Thus Fig. 9 reads 1°, 20' (on the upper scale) +10' (because the index indicates half a 20' interval) plus 1', 12.8" (the micrometer reading) making a total of 1°, 31', 12.8".

The above characteristics arise from the fact that 20 minute graduation intervals produce coincidences every 10 minutes, and these will occur at, or 10 minutes away from, the fixed index alternately. The micrometer has a range of 10 minutes, and its reading must be increased 10 minutes if the index splits a 20 minute interval but not if the index is on the graduation.

The complete instrument in a preferred form has been described in considerable detail, to develop the possibility and desirability of using optical sub-assemblies, and to explain the simplicity and precision of the optical micrometer. Modifications are possible and a few will be mentioned.

In the micrometer it is not essential that the second set of wedge prisms be the movable set. Except for mechanical restrictions imposed by other parts, it might desirably be the other way round.

The use of two wedges reversely set is desirable because two images are adjusted, and for a given deflection by the prisms the travel of the carriage can be halved. However, the effect can be had in a useful degree with one fixed and one moving wedge prisms, one restoring the direction from which the other produces deflection.

The feature of reading the actual position of the prism carriage, rather than (for example) the position of the adjusting knob 126 assures accuracy and greatly facilitates taking the reading through telescope 29. Some of the advantages of the micrometer can be had with modified reading arrangements.

We claim:

1. An angle-measuring device comprising in combination a circular limb graduated to produce uniform angle-defining intervals; an optical system for producing two juxtaposed images of diametrically opposite portions of said limb, the limb and said optical system being relatively rotatable about the axis of the limb; means forming an index against which one of said images may be read in terms of full intervals; at least one prism interposed in the path of light which forms one of said images; a carriage supporting and guiding said prism in the direction of the path of the image-forming light, displacement of the prism along said path causing relative motion of said images sufficient to cause register of the image graduations; a graduated scale and related index, one of which moves bodily with said prism, for indicating the position of the prism in terms of a fraction of said interval; and a single viewing means for said images and the first named index and also for said scale and related index.

2. An angle-measuring device comprising in combination a circular limb graduated to produce uniform angle-defining intervals; an optical system for producing two juxtaposed images of diametrically opposite portions of said limb, the limb and said optical system being relatively rotatable about the axis of the limbs; means forming an index against which one of said images may be read in terms of full intervals; two prisms serially interposed in the path of light which forms one of said images, the first of said prisms serving to deflect said light and the second serving to restore the direction from which deflection occurred; a carriage supporting and guiding one of said prisms in the direction of the path of the image-forming light, displacement of the prism along said path causing relative motion of said images sufficient to cause register of the image graduations; a graduated scale and related index, one of which moves bodily with said carriage-supported prism, for indicating the position of the prism in terms of a fraction of said interval; and a single viewing means for said images and the first named index and also for said scale and related index.

3. An angle-measuring device comprising in combination a circular limb graduated to produce uniform angle-defining intervals; an optical system for producing two juxtaposed images of diametrically opposite portions of said limb, the limb and said optical system being relatively rotatable about the axis of the limb; means forming an index against which one of said images may be read in terms of full intervals; a pair of reversely arranged prisms interposed in respective paths of light forming said images; a carriage for guiding said prisms in the direction of the path of the image-forming light, displacement of the prisms along said path causing relative motion of said images sufficient to cause register of the image graduations; a graduated scale and related index, one of which moves bodily with said prisms, for indicating the position of said prisms in terms of a fraction of said intervals; and a single viewing means for said images and the first named index and also for said scale and its related index.

4. An angle-measuring device, comprising in combination, a circular limb graduated to produce uniform angle defining intervals; an optical system for projecting two juxtaposed images of diametrically opposite portions of said limb, the limb and said optical system being relatively rotatable about the axis of the limb; means forming an index against which one of said images may be read in terms of full intervals; a pair of wedge prisms set base to apex in the paths of projection of respective images and serving to deflect both paths; a second pair of reversely set prisms serving to restore the paths to their original direction; a carriage for guiding one of said pairs of prisms to move in the direction of image projection; a graduated scale and related index for indicating the position of the movable pair of prisms in terms of a fraction of an interval; and a focusing optical system for viewing said juxtaposed images.

5. The combination of a circular graduated limb; a limb reading system comprising lens system with field dividing prisms arranged to project, on a focal plane, juxtaposed images of diametrically opposite portions of said limb; two pairs of wedge prisms interposed in the optical path between the lens system and the focal plane, the prisms of each pair being set base to apex so that they produce opposite deflections of the rays forming respective images, and the other pair being reversely arranged relatively to the first so as to restore the directions from which the first produces deflection, one of said pairs being fixed and the other movable in the direction of the optical axis to cause proportional image displacement; means for indicating the adjusted position of the movable pair as a function of graduation interval of the limb; and a telescope for viewing the juxtaposed images.

6. The combination of a circular graduated limb; a limb reading system comprising a lens system with field-dividing prisms arranged to project, on a focal plane, juxtaposed images of diametrically opposite portions of said limb; two pairs of wedge prisms interposed in the optical path between the limb reading system and the focal plane, the prisms of each pair being set base to apex so that they produce opposite deflections of the rays forming respective images, and the second pair being reversely arranged relatively to the first so as to restore the directions from which the first produces deflection, one of said pairs being fixed and the other movable in the direction of the optical axis to cause proportional image displacement; a graduated scale and coacting index, one of which moves with the movable pair of wedge prisms to indicate the adjusted position thereof as a function of graduation interval of the limb; means for forming an image of said scale and index; and a single telescope for viewing the juxtaposed images of the limb and the image of said scale and index.

7. The combination defined in claim 6 in which there are two graduated limbs and two limb reading systems, one associated with each limb, and in which shiftable optical means are provided to relate the limb reading systems selectively with the pairs of prisms and the telescope.

8. A magnifying optical system for producing two juxtaposed images of uniform graduations; two pairs of wedge prisms interposed in said system, the prisms of each pair being set base to apex so that they produce opposite deflections and the two sets being reversely arranged as to each other so that the second pair restores the direction from which the first causes deflection, the prisms being so interposed in the optical system that each prism of a pair affects the ray pencil forming a corresponding image; means for adjusting one set of prisms in the direction of the axis of the optical system to cause register of the graduations of the two images; and a graduated scale for indicating directly the adjusted position of the movable pair of prisms as a function of the graduation interval.

9. A magnifying optical system for producing two juxtaposed images of uniform graduations; two pairs of wedge prisms interposed in said system, the prisms of each pair being set base to apex so that they produce opposite deflections and the two sets being reversely arranged as to each other so that the second pair restores the direction from which the first causes deflection, the prisms being so interposed in the optical system that each prism of a pair affects the ray pencil forming a corresponding image; means for adjusting one set of prisms in the direction of the axis of the optical system to cause register of the graduations of the two images; a graduated scale for indicating directly the adjusted position of the movable pair of prisms as a function of the graduation interval; and a single viewing telescope for viewing said images and said graduated scale.

10. A device for reading the horizontal and vertical circles of engineering instruments which include an alidade, such reading mechanism comprising an optical system made up of three optically related sub-assemblies, one of said sub-assemblies comprising optical units which are normally fixed and serve to project related images of the horizontal circle, all mounted within the structure of the alidade, and the other two sub-assemblies including parts which are shifted as an incident to their use one serving to project related images of the vertical circle, and the other serving as an optical micrometer as to either set of projected images, the last named two assemblies being individually mounted on independent bases which are releasably attached in definite relationship to the alidade and may be removed therefrom without dismantling the instrument proper.

11. A device for reading the horizontal and vertical circles of engineering instruments which include such circles and an alidade, such reading mechanism comprising a first sub-assembly including a pair of reading prisms and image projecting lenses fixedly mounted in the alidade in reading relation to the horizontal circle; a second sub-assembly comprising a base plate, reading prisms and image projecting lenses in reading relation to the vertical circle, the reading prisms being angularly adjustable on the base plate, and the lenses being fixedly mounted on the base plate; and a third sub-assembly including a base plate and an optical micrometer mounted thereon, said micrometer including movable elements which are adjusted in use, the base plates carrying the second and third sub-assemblies being removable from the alidade without dismantling the instrument; and means for optically relating the third sub-assembly to each of the others.

12. A surveying instrument comprising an alidade mounted to turn on a vertical axis, said alidade having a hollow base and hollow upstanding frame members; a telescope mounted on a horizontal axis on said frame members; graduated circles, one attached to said telescope to indicate the angular position thereof and the other associated with said vertical axis to indicate the angular position of the alidade thereon; and an optical system for reading said graduated circles comprising as a first sub-assembly an optical micrometer unit constructed as a complete unit on its own base mounted within one of said upstanding frame members and removable therefrom as a unit without dismounting the telescope or the alidade; a second sub-assembly for reading the vertical circle and comprising an optical reading unit on its own base mounted in the second upstanding frame member and removable therefrom as a unit without dismounting the telescope or alidade, the last named assembly including adjustable means for zeroing the optics; a third sub-assembly comprising fixed optical components mounted in the base of the alidade and forming a unit for reading the horizontal circle; and selective means for optically relating the second and third sub-assembly units with the first.

13. In a surveying instrument, the combination of a leveling head; an alidade mounted on a vertical axis on said head; a graduated circle on said head for indicating the angular position of the alidade on the vertical axis; a sighting device mounted on a horizontal axis on the alidade; a graduated circle mounted on the sighting device to indicate the angular position thereof in said horizontal axis; and a reading system for said circles comprising three unitary sub-assemblies, each rigidly mounted on said alidade in coactive relation to another, and each removable independently of the others, the first sub-assembly being an optical micrometer comprising a base, prisms fixed on said base and defining an optical axis, a carriage guided on said base in the direction of the optical axis, prisms carried by the carriage along said axis and means for indicating the position of the carriage; the second and third sub-assemblies being image projecting units for respective graduated circles and comprising each a base, reading prisms carried by said base for transmitting image light from diametrically opposite portions of said circles, and lens systems associated with said reading prisms and arranged to project composite images of said circles; and light switching means adjustable to cause the lens systems of the second and third sub-assemblies selectively to project image forming light along the axis of the optical micrometer.

14. The combination defined in claim 13 in which the alidade has a hollow base and hollow upstanding frame members on which the sighting device is pivoted, and in which the first sub-assembly is mounted in one frame member, the second and third are mounted respectively in the hollow base and the other frame member, and reflecting prisms are included in at least one of the sub-assemblies selectively to relate the second or third sub-assemblies optically with the first.

15. In a surveying instrument, the combination of a leveling head; an alidade mounted on a vertical axis on said head; a graduated circle on said head for indicating the angular position of the alidade on the vertical axis; a sighting device mounted on a horizontal axis on the alidade; a graduated circle mounted on the sighting device to indicate the angular position thereof in said horizontal axis; and a reading system for said circles comprising three unitary sub-assemblies, each rigidly mounted on said alidade in coactive relation to one another, and each removable independently of the others, the first sub-assembly being an optical micrometer comprising a base, prisms fixed on said base and defining an optical axis, a carriage guided on said base in the direction of the optical axis, prisms carried by the carriage along said axis and means for indicating the position of the carriage; the second sub-assembly being an image projecting unit comprising a base, reading prisms fixedly mounted thereon for transmitting image light from diametrically opposite portions of the first named graduated circle and a fixedly mounted lens system associated with said prisms to project a composite image of said circle; the third sub-assembly being an image projecting unit comprising a base, reading prisms for transmitting image light from diametrically opposite portions of the second named graduated circle and a lens system associated with said prisms to project a composite image of said circle, said lens system being fixed on said base and said reading prisms being angularly adjustable thereon about an axis coincident with the axis of the sighting means; and light switching means adjustable to cause the lens systems of the second and third sub-assemblies selectively to project image forming light along the axis of the optical micrometer.

16. The combination of claim 15 in which the alidade has a hollow base and hollow upstanding frame members on which the sighting device is pivoted, and in which the first sub-assembly is mounted in one frame member, the second and third are mounted respectively in the hollow base and the other frame member, reflecting prisms being included in at least one of the sub-assemblies to relate the sub-assemblies optically with one another, and the third assembly including limiting means to indicate the correct adjustment of its reading prisms.

HAROLD R. LARSEN.
JOHN B. SONDERMAN.